(12) United States Patent
Wu et al.

(10) Patent No.: US 11,958,217 B2
(45) Date of Patent: Apr. 16, 2024

(54) SYSTEMS AND METHODS FOR COMPACTING COMPOSITE COMPONENTS

(71) Applicant: General Electric Company, Schenectady, NY (US)

(72) Inventors: Wei Wu, Mason, OH (US); Darrell Glenn Senile, Oxford, OH (US); Thomas Samuel Holaday, Park Hills, KY (US)

(73) Assignee: General Electric Company, Schenectady, NY (US)

( * ) Notice: Subject to any disclaimer, the term of this patent is extended or adjusted under 35 U.S.C. 154(b) by 371 days.

(21) Appl. No.: 15/727,722

(22) Filed: Oct. 9, 2017

(65) Prior Publication Data
US 2019/0105814 A1  Apr. 11, 2019

(51) Int. Cl.
| | | |
|---|---|---|
| B29C 43/02 | (2006.01) | |
| B29C 43/52 | (2006.01) | |
| F01D 9/02 | (2006.01) | |
| F01D 25/00 | (2006.01) | |
| F01D 9/04 | (2006.01) | |
| B29L 31/00 | (2006.01) | |

(52) U.S. Cl.
CPC ............. *B29C 43/02* (2013.01); *B29C 43/52* (2013.01); *F01D 9/02* (2013.01); *F01D 9/041* (2013.01); *F01D 25/005* (2013.01); *B29L 2031/7504* (2013.01); *F05D 2220/32* (2013.01); *F05D 2230/50* (2013.01); *F05D 2240/128* (2013.01); *F05D 2300/6033* (2013.01)

(58) Field of Classification Search
CPC . B29C 43/02; B29C 43/52; B29C 2043/3261; B29C 66/73112; B29C 33/3828; B22F 3/03
See application file for complete search history.

(56) References Cited

U.S. PATENT DOCUMENTS

| | | | |
|---|---|---|---|
| 3,967,996 A | 7/1976 | Kamov et al. | |
| 5,286,438 A | 2/1994 | Dublinski et al. | |
| 5,820,894 A | 10/1998 | Kreutzer | |
| 6,024,554 A * | 2/2000 | Lawrence | A21C 3/02 |
| | | | 425/310 |

(Continued)

OTHER PUBLICATIONS

Explore the World of Piping, Flanges General. http://www.wermac.org/flanges/flanges_welding-neck_socket-weld_lap-joint_screwed_blind.html (Year: 2014).*

*Primary Examiner* — Farah Taufiq
(74) *Attorney, Agent, or Firm* — Dority & Manning, P.A.

(57) ABSTRACT

Systems and methods for compacting components are provided. In one exemplary aspect, a component is positioned between a first tool portion and a second tool portion of a compaction tool. A sandwich structure is positioned between the first tool portion and the component. The sandwich structure includes a thermally expandable material and a rigid shell. The thermally expandable material is positioned between the first tool portion and the rigid shell. During compaction, the thermally expandable material is subjected to elevated temperatures and pressures, e.g., within an autoclave. When subjected to elevated temperatures and pressures, the thermally expandable material applies a force on the rigid shell, which in turn applies a force on the component so as to compact the component between the rigid shell and the second tool portion.

18 Claims, 10 Drawing Sheets

(56) References Cited

U.S. PATENT DOCUMENTS

| | | | |
|---|---|---|---|
| 6,024,555 A | 2/2000 | Goodridge et al. | |
| 6,254,812 B1 | 7/2001 | Goodridge et al. | |
| 6,572,795 B1 | 6/2003 | Daly | |
| 6,759,002 B1 | 7/2004 | Engwall et al. | |
| 7,690,911 B2 | 4/2010 | Haney | |
| 8,034,278 B2* | 10/2011 | Lopez | B29C 70/44 |
| | | | 264/314 |
| 8,394,310 B2* | 3/2013 | Hanson | B29C 70/446 |
| | | | 264/313 |
| 8,668,800 B2 | 3/2014 | Guitton | |
| 8,691,137 B2 | 4/2014 | Prebil et al. | |
| 9,227,386 B2 | 1/2016 | Hattori et al. | |
| 9,623,620 B2* | 4/2017 | Brizon | B29D 99/0014 |
| 2009/0127738 A1* | 5/2009 | Smith | B29C 45/1671 |
| | | | 264/254 |
| 2013/0075025 A1* | 3/2013 | Guitton | B29C 33/485 |
| | | | 156/245 |
| 2014/0093379 A1* | 4/2014 | Tibbott | F01D 5/189 |
| | | | 416/224 |
| 2014/0271161 A1* | 9/2014 | Lazur | F01D 5/282 |
| | | | 415/200 |
| 2015/0343669 A1 | 12/2015 | Jensen et al. | |
| 2016/0271844 A1* | 9/2016 | Lyons | B29C 33/3842 |
| 2016/0312795 A1* | 10/2016 | Crall | F04D 29/023 |
| 2017/0321649 A1* | 11/2017 | Beaulieu | B29C 70/745 |

\* cited by examiner

SYSTEMS AND METHODS FOR COMPACTING COMPOSITE COMPONENTS

FIELD

The present subject matter relates generally to composite components for gas turbine engines. More particularly, the present subject matter relates to systems and methods for compacting composite components.

BACKGROUND

A gas turbine engine generally includes a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

Typically, components inside the combustion and turbine sections are complex to manufacture due to their geometries. Moreover, the working environment for such components is extremely severe due to the high temperature and pressures. Accordingly, components within the flow path of the combustion gases have strict requirements for their geometrical profiles and temperature tolerance to maintain desired efficiency of the engine. As ceramic matrix composite (CMC) materials can better withstand such severe environments than traditional materials, there is particular interest in replacing components formed of traditional materials inside gas turbine engine with CMC materials.

Composite components can undergo a compaction or debulking process during manufacture. For instance, one way to compact composite components is to use a closed tool within an autoclave. Typically, a composite component and a soft, expanding material are positioned between a first tool and a second tool of the closed tool. The expanding material is positioned between the composite component and the first tool. Within the autoclave, the pressure loading drives the first and second tool to close at a fixed location. This action ensures that the outer profile of the composite component meets its geometrical profile requirement. The elevated autoclave temperature makes the expanding material expand and compress the composite component against the second tool of the closed tool. In this way, the composite component is compacted.

Such method of compacting composite components has presented certain challenges. For instance, the expanding material is prone to non-uniform expansion when subjected to elevated temperatures and pressures, and as the expanding material applies the compaction force directly on the composite component, dimensional control of the composite component can be difficult to achieve. Accordingly, composite components frequently need to be further machined to bring them within specification. Dimensional control of composite components having complex geometries (e.g., airfoils with internal cooling cavities) can be particularly challenging to achieve, especially the surfaces of the component that define the internal cavities due to an insufficient or nonexistent internal compacting force working on such surfaces.

Accordingly, improved compaction systems and methods that address one or more of the challenges noted above would be useful. In particular, compaction systems and methods that provide improved compaction and dimensional control and reduce machining efforts would be advantageous.

BRIEF DESCRIPTION

Aspects and advantages of the invention will be set forth in part in the following description, or may be obvious from the description, or may be learned through practice of the invention.

In one exemplary aspect, the present disclosure is directed to a method for compacting a component using a compaction tool that includes a first tool portion and a second tool portion. The method includes positioning at least a portion of the component between the first tool portion and the second tool portion. The method also includes positioning a sandwich structure between the first tool portion and the component, the sandwich structure comprising a thermally expandable material and a rigid shell, wherein the thermally expandable material is positioned between the first tool portion and the rigid shell. The method further includes compacting the component by subjecting the thermally expandable material to elevated temperatures and pressures such that the thermally expandable material applies a force on the rigid shell which in turn applies a force on the component so as to compact the component between the rigid shell and the second tool portion.

In another exemplary aspect, the present disclosure is directed to a compaction system for compacting a component. The compaction system includes an autoclave and a compaction tool removably insertable within the autoclave. The compaction tool includes a first tool portion and a second tool portion defining a volume therebetween. The first tool portion and the second tool portion are fixed relative to one another during compacting. The compaction system further includes a sandwich structure disposed within the volume between the first tool portion and the second tool portion, the sandwich structure comprising a thermally expandable material and a rigid shell, wherein the thermally expandable material is positioned between the first tool portion and the rigid shell. The component is removably insertable into the volume, and wherein when the component is inserted within the volume, the component is positioned between the rigid shell and the second tool portion of the compaction tool.

In another exemplary aspect, the present disclosure is directed to a method for compacting a component using a compaction tool. The component defines at least one internal cavity. The compaction tool includes a first tool and a second tool. The second tool extends along at least a portion of the perimeter of the component and defines a volume. The method includes positioning at least a portion of the component within the volume. The method further includes positioning the first tool within the at least one internal cavity. Moreover, the method includes positioning a sandwich structure between the first tool and the component, the sandwich structure comprising a thermally expandable material and a rigid shell, wherein the thermally expandable material is positioned between the first tool and the rigid shell. In addition, the method includes compacting the component by subjecting the thermally expandable material to elevated temperatures and pressures such that the thermally expandable material applies a force on the rigid shell which in turn applies a force on the component so as to compact the component between the rigid shell and the second tool.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
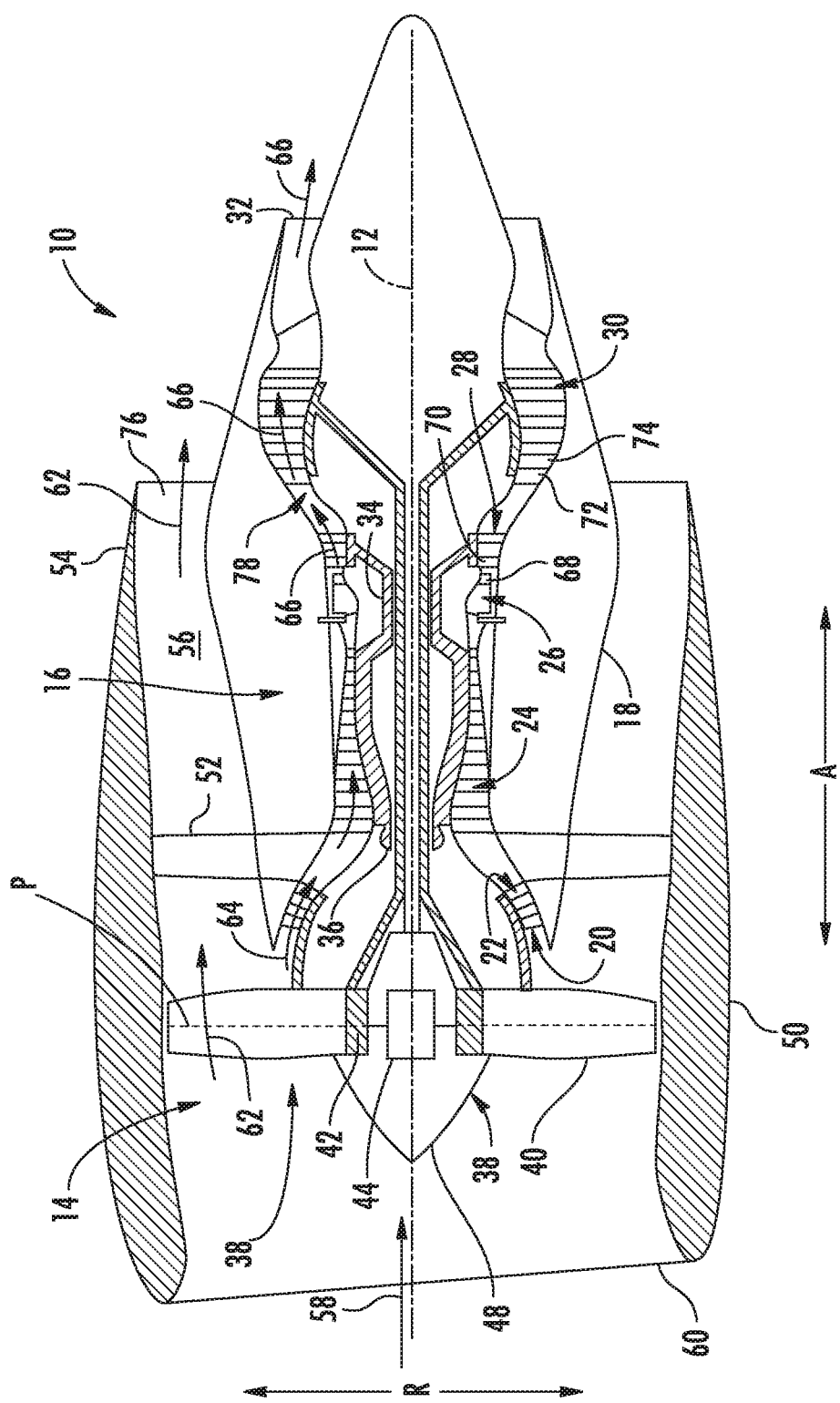
FIG. 1 is a schematic cross-sectional view of an exemplary gas turbine engine according to various embodiments of the present subject matter.

Repeat use of reference characters in the present specification and drawings is intended to represent the same or analogous features or elements.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows.

Exemplary aspects of the present disclosure are directed to systems and methods for compacting components, such as e.g., composite components. In one exemplary aspect, at least a portion of a composite component is positioned between a first tool portion and a second tool portion of a compaction tool, such as e.g., a closed tool. In addition, a sandwich structure is positioned between the first tool portion and the composite component. The sandwich structure includes a thermally expandable material and a rigid shell. The thermally expandable material is positioned between the first tool portion and the rigid shell. During a compaction process, the composite component is compacted by subjecting the thermally expandable material to elevated temperatures and pressures, e.g., within an autoclave. When subjected to elevated temperatures and pressures, the thermally expandable material applies a force on the rigid shell. The rigid shell in turn applies a force on the composite component so as to compact the composite component between the rigid shell and the second tool portion. In this way, improved compaction of the composite component and dimensional accuracy of the surfaces of the composite component may be achieved.

FIG. 1 provides a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It will be appreciated that, although described with respect to turbofan 10 having core turbine engine 16, the present subject matter may be applicable to other types of turbomachinery. For example, the present subject matter may be suitable for use with or in turboprops, turboshafts, turbojets, industrial and marine gas turbine engines, and/or auxiliary power units.

In some embodiments, components of turbofan engine 10 can be formed of a composite material. For example, components within hot gas path 78, such as components of combustion section 26, HP turbine 28, and/or LP turbine 30, can be formed of a ceramic matrix composite (CMC) material, which is a non-metallic material having high temperature capability. For instance, turbine blades and turbine nozzles can be formed of CMC materials. Other components of turbine engine 10 also may be formed from CMC materials or other suitable composite materials, such as e.g., a polymer matrix composite (PMC) material.

Exemplary CMC materials utilized for such composite components can include silicon carbide, silicon, silica, or alumina matrix materials and combinations thereof. Ceramic fibers can be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). CMC materials may have coefficients of thermal expansion in the range of about $1.3 \times 10^{-6}$ in/in/° F. to about $3.5 \times 10^{-6}$ in/in/° F. in a temperature range of approximately 1000-1200° F.

An exemplary fabrication process for such CMC components can include laying up one or more layers formed of "prepregs," or tape-like structures that include a reinforcement material (e.g., carbon fibers) impregnated with a slurry that contains a precursor of matrix material and one or more organic binders. The prepreg tapes undergo processing (including firing) to convert the precursor to the desired ceramic. Multiple plies of the resulting prepregs are then stacked and debulked to form a laminate preform.

Then, the preform component can undergo a compaction process, a burnout process, and a melt infiltrate process to cure the preform. More specifically, after the layup process, the preform component can be processed in an autoclave and subjected to elevated temperatures and pressures to produce a compacted, green state component. Various volatiles can be removed during compaction. Then, the green state component can be placed in a furnace to burn out excess binders or the like and then can be placed in a furnace with a piece or slab of silicon and fired to melt infiltrate the component with at least silicon. More particularly, heating (i.e., firing) the green state component in a vacuum or inert atmosphere decomposes the binders, removes the solvents, and converts the precursor to the desired pyrolyzed material. The decomposition of the binders results in a porous pyrolyzed body; the body may undergo densification, e.g., melt infiltration (MI), to fill the porosity. In one example, where the pyrolyzed component is fired with silicon, the component can undergo silicon melt-infiltration. However, densification can be performed using any known densification technique including, but not limited to, Silcomp, melt infiltration (MI), chemical vapor infiltration (CVI), polymer infiltration and pyrolysis (PIP), and oxide/oxide processes, and with any suitable materials including but not limited to silicon. In one embodiment, densification and firing may be conducted in a vacuum furnace or an inert atmosphere having an established atmosphere at temperatures above 1200° C. to allow silicon or other appropriate material or combination of materials to melt-infiltrate into the component.

Thereafter, the densified composite component can be finish machined as necessary. For instance, the component can be grinded or otherwise machined, e.g., to bring the component within tolerance and to shape the component to the desired shape. It will be appreciated that other methods or processes for forming composite components can be used as well.

Figure 2:
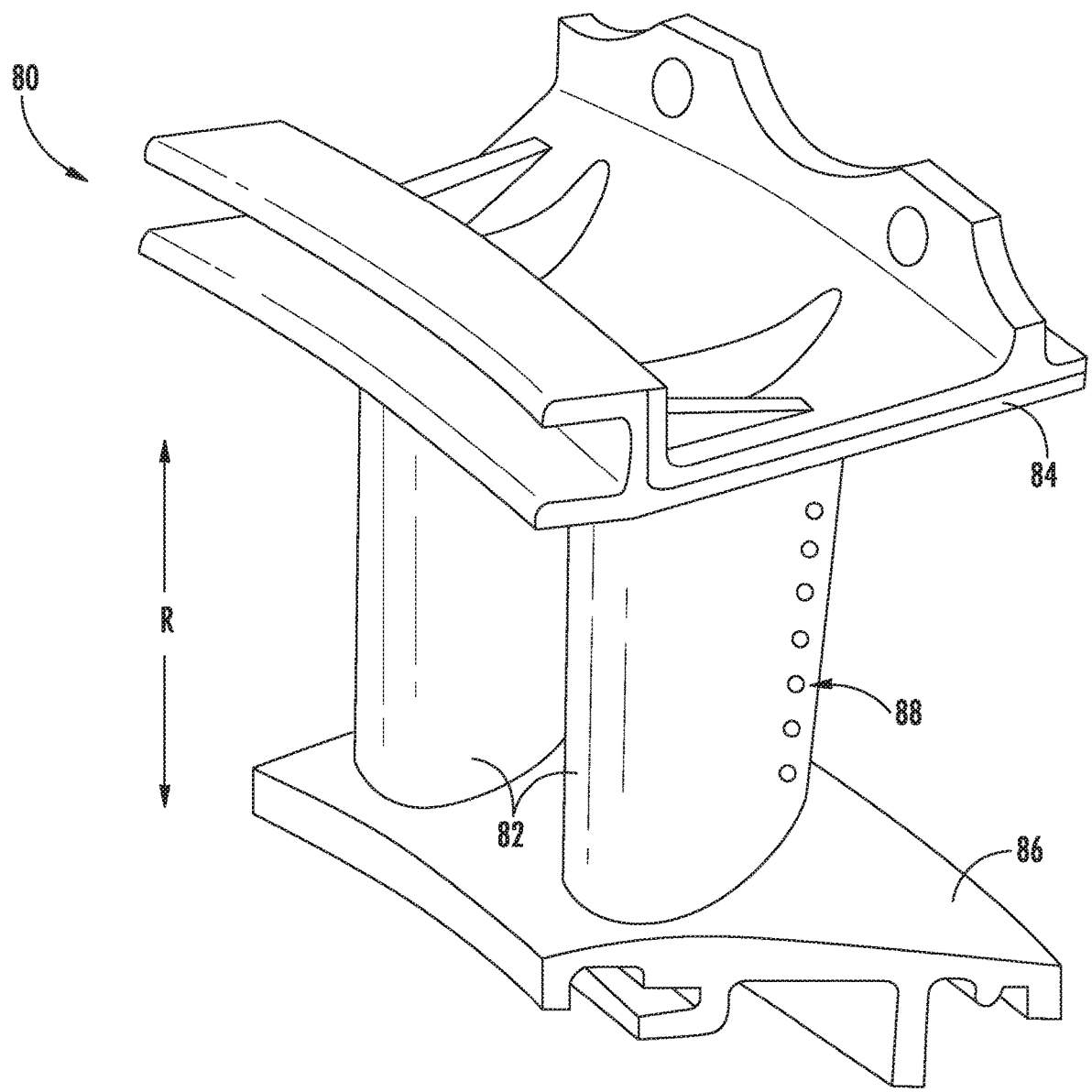
FIG. 2 provides a perspective view of a turbine nozzle segment according to an exemplary embodiment of the present subject matter.

FIG. 2 provides a perspective view of a turbine nozzle segment 80 according to an exemplary embodiment of the present subject matter. For this embodiment, the turbine nozzle segment 80 is formed of a CMC material, such as one or more of the CMC materials noted above. The turbine nozzle segment 80 is one of a number of nozzle segments that when connected together form an annular-shaped nozzle assembly of a gas turbine engine, such as e.g., the turbofan engine 10 of FIG. 1. The nozzle segment 80 includes vanes 82, such as e.g., stator vanes 68 of the turbofan engine 10 of FIG. 1. Each vane 82 defines an airfoil and extends between an outer and inner band 84, 86. Notably, the vanes 82 define a plurality of cooling holes 88. Cooling holes 88 provide film cooling to improve the thermal capability of the vanes 82. The cooling holes 88 can be fluidly connected to one or more fluid passageways that extend internally through vanes 82. As will be explained more fully below, one or more portions of the turbine nozzle segment 80 can be subjected to a compaction process, e.g., to remove volatiles.

Figure 3:
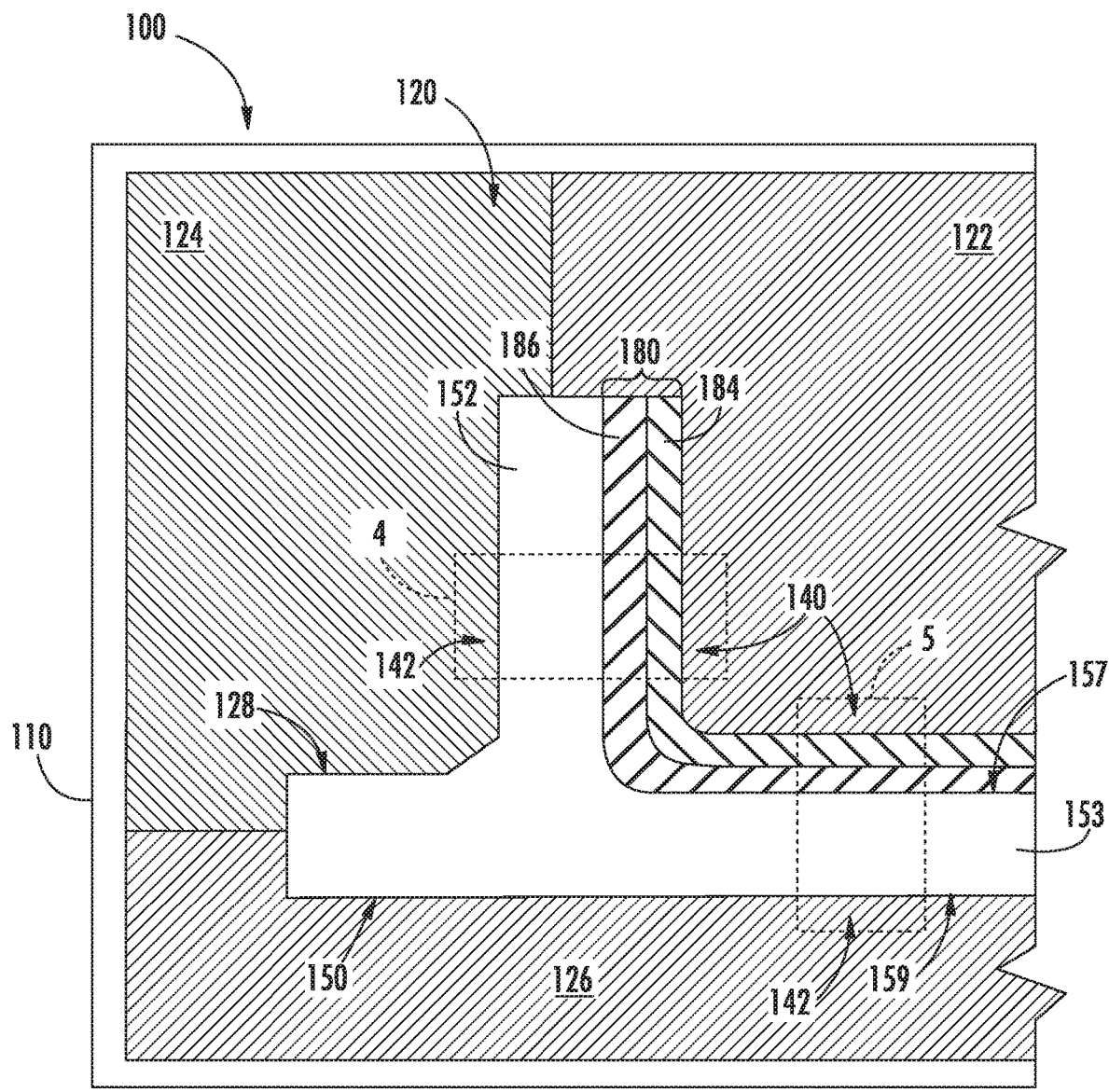
FIG. 3 provides an exemplary composite component undergoing a compaction process according to an exemplary embodiment of the present subject matter.
Figure 4:
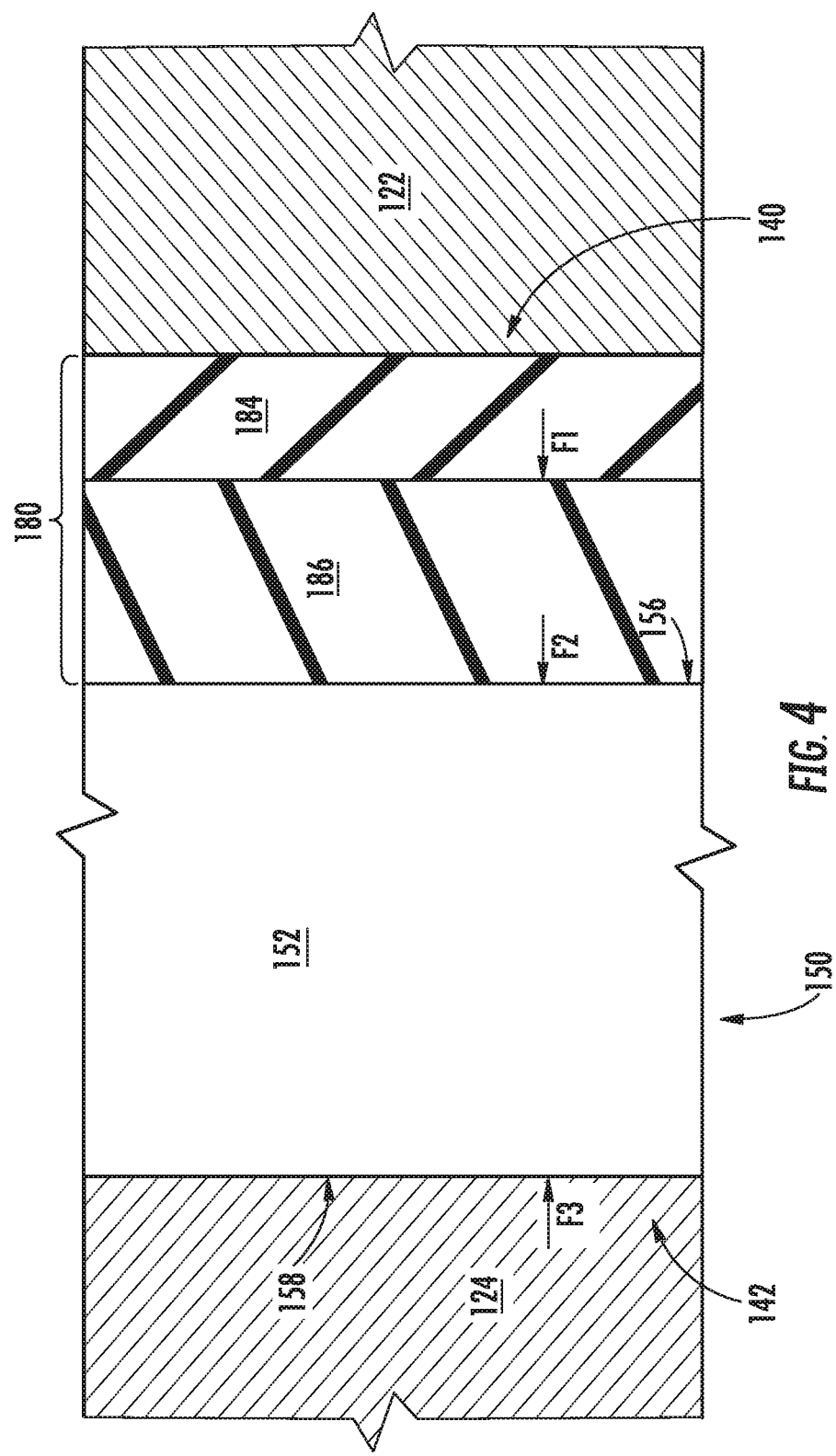
FIG. 4 provides a close up view of Section 4 of FIG. 3.
Figure 5:
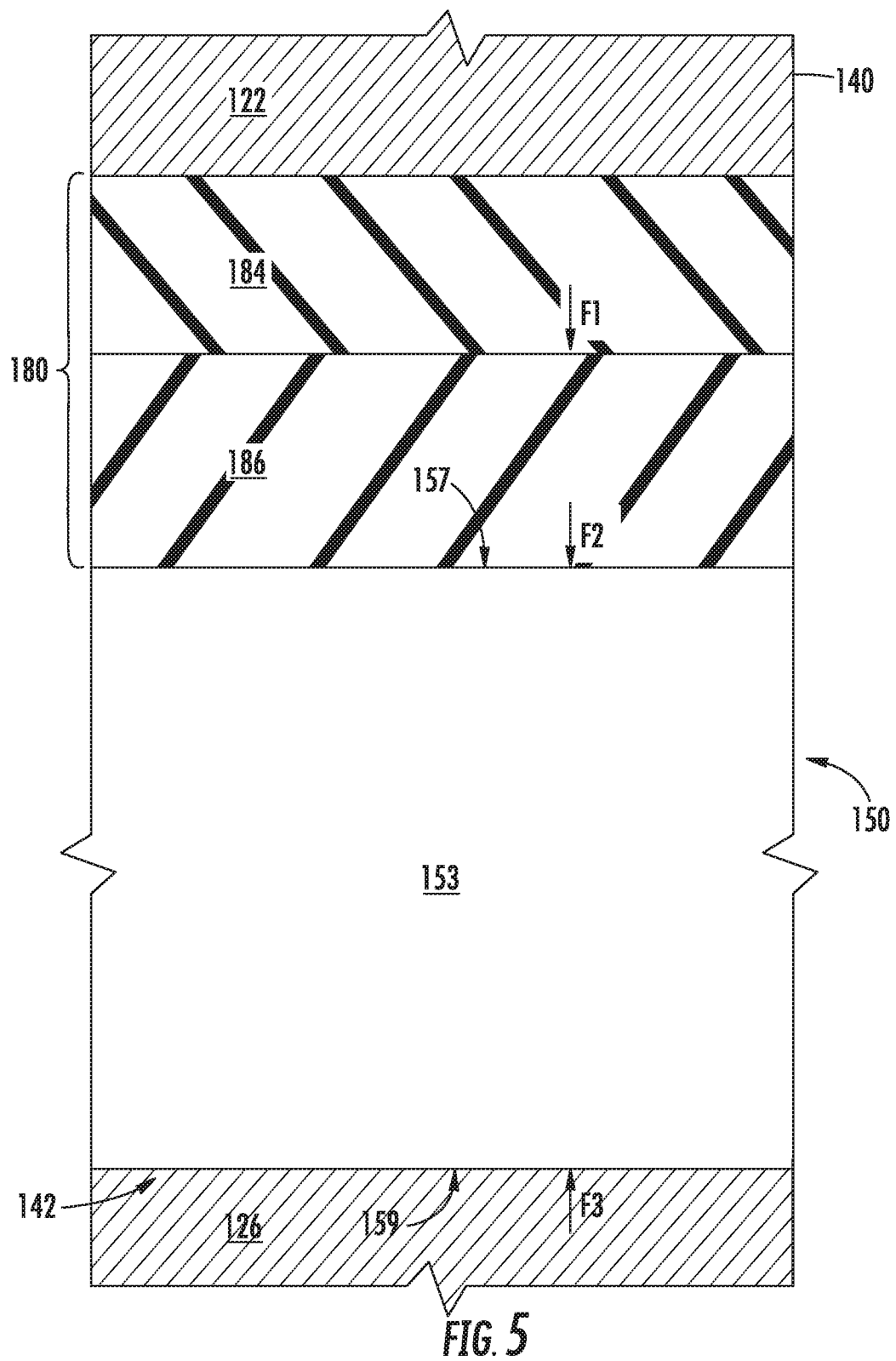
FIG. 5 provides a close up view of Section 5 of FIG. 3.

FIGS. 3 through 5 provide an exemplary composite component 150 undergoing a compaction process in a compaction system 100 according to an exemplary embodiment of the present subject matter. FIG. 4 provides a close up view of Section 4 of FIG. 3 and FIG. 5 provides a close up view of Section 5 of FIG. 3. The composite component 150 can be the turbine nozzle segment 80 of FIG. 2 or other components of the turbofan engine 10 of FIG. 1, for example. The composite component can be formed of a suitable composite material, such as e.g., a CMC material or a PMC material.

As shown in FIG. 3, for this embodiment, the compaction system 100 includes an autoclave 110 and a compaction tool 120 disposed within the autoclave 110. The compaction tool 120 and the composite component 150 are fully enclosed within the autoclave 110 and are subjected to elevated temperatures and pressures during a compaction cycle. The compaction tool 120 is removably insertable into the autoclave 110 to facilitate loading and unloading of the composite component 150 into and from the compaction tool 120.

Moreover, for this embodiment, the compaction tool 120 is a closed tool, or a tool having one or more tools or walls that define an enclosed volume or space in which a component may be positioned and compacted. In the depicted embodiment of FIG. 3, the compaction tool 120 includes a first tool 122, a second tool 124, and a third tool 126 that are bolted together to form a closed tool assembly and define a closed volume 128 in which at least a portion of the composite component 150 is positioned and compacted. During a compaction cycle, the first, second, and third tools 122, 124, 126 are fixed in place relative to one another. Although the first tool 122 and the second tool 124 are shown as separate pieces in FIG. 3, the first tool 122 and second tool 124 can be connected or contiguous with one another in alternative exemplary embodiments. In yet other alternative embodiments, compaction tool 120 can include any suitable number of tool pieces. The compaction tool 120, and more specifically the first, second, and third tools 122, 124, 126 can be formed of any suitable material. For instance, compaction tool 120 can be formed of a metal material or another suitable hard and rigid material capable of maintaining its shape when subjected to elevated temperatures and pressures.

As shown in Section 4 of FIG. 3, first tool 122 defines a first tool portion 140 and second tool 124 defines a second tool portion 142. In Section 5 of FIG. 3, first tool 122 defines first tool portion 140 and third tool 126 defines second tool portion 142. As further shown in FIG. 3, at least a portion of the composite component 150 is positioned between the first tool portions 140 and the second tool portions 142. In particular, for this embodiment, a first flange 152 of the composite component 150 is positioned between the first tool portion 140 of the first tool 122 and the second tool portion 142 of the second tool 124 as shown in Section 4 of FIG. 3. As shown in Section 5 of FIG. 3, a body 153 of the composite component 150 is positioned between the first tool portion 140 of the first tool 122 and the second tool portion 142 of the third tool 126.

In addition, as shown in FIG. 3, a sandwich structure 180 is positioned between the first tool portions 140 and the composite component 150. More specifically, the sandwich structure 180 is positioned between the first tool portion 140 and the flange 152 of the composite component 150 in Section 4 and the sandwich structure 180 is positioned between the first tool portion 140 and the body 153 of the composite component 150 in Section 5. The sandwich structure 180 includes an expandable core or thermally expandable material 184 and a rigid caul or rigid shell 186. The thermally expandable material 184 is positioned between the first tool portions 140 and the rigid shell 186 as shown. The rigid shell 186 is shown shaped complementary to an inner surface 156 of the composite component 150.

The thermally expandable material 184 can be any suitable material that is capable of thermally expanding at elevated temperatures and pressures, e.g., the temperature and pressures typically experienced by composite components during a compaction process in an autoclave. For this embodiment, the thermally expandable material 184 is a Room-Temperature Vulcanizing (RTV) rubber material. In some embodiments, the RTV rubber material can be castable such that it can be formed to a desired shape. The rigid shell 186 can be formed of various suitable materials as well. As one example, the rigid shell 186 is formed of a metal material. As another example, the rigid shell 186 is formed of a composite material, such as e.g., a cured PMC material. As yet another example, the rigid shell 186 can be formed of a material that has a density greater than a density of the composite material of the composite component 150.

During a compaction cycle or process, the composite component 150 is compacted at elevated temperatures and pressures within the autoclave 110. The sandwich structure 180 and the compaction tool 120 are also subjected to the elevated temperatures and pressures. In particular, during the compaction cycle, the thermally expandable material 184 expands due to the elevated temperature and pressure within the autoclave 110. As the thermally expandable material 184 is positioned between the fixed first tool portions 140 and the non-fixed rigid shell 186, the thermally expandable material 184 expands in a direction opposite the first tool portions 140 toward the rigid shell 186.

As shown particularly in FIG. 4, as the thermally expandable material 184 expands, it acts as an internal driving force and applies a force F1 on the non-fixed rigid shell 186. The force F1 applied on the rigid shell 186 moves the rigid shell 186 toward the first flange 152 of the composite component 150. The rigid shell 186 in turn applies a force F2 on the first flange 152 so as to compact the first flange 152 between the rigid shell 186 and the fixed second tool portion 142, which is defined by second tool 124 in Section 4 of FIG. 3. Stated alternatively, the fixed second tool portion 142 defined by second tool 124 applies an opposing force F3 (e.g., a force opposing F2) so that the first flange 152 is sandwiched between the rigid shell 186 and the second tool portion 142 of the second tool 124.

By positioning the rigid shell 186 between the thermally expandable material 184 and the first flange 152 of the composite component 150, a more uniform push or force can be applied on the first flange 152 of the composite component 150 when the thermally expandable material 184 expands. In this way, the inner surface 156 of the first flange 152 can be formed to the desired shape with high dimensional accuracy. In addition, as the outer surface 158 of the first flange 152 is compacted against the second tool portion 142 of the second tool 124, which is fixed, the outer surface 158 of the composite component 150 can be conformed to the desired shape as well.

As shown particularly in FIG. 5, as the thermally expandable material 184 expands, it acts as an internal driving force and applies a force F1 on the non-fixed rigid shell 186. The force F1 applied on the rigid shell 186 moves the rigid shell 186 toward the body 153 of the composite component 150. The rigid shell 186 in turn applies a force F2 on the body 153 so as to compact the body 153 between the rigid shell 186 and the fixed second tool portion 142, which is defined by third tool 126 in Section 5 of FIG. 3. Stated alternatively, the fixed second tool portion 142 defined by third tool 126 applies an opposing force F3 (e.g., a force opposing F2) so that the body 153 is sandwiched between the rigid shell 186 and the second tool portion 142 of the third tool 126.

By positioning the rigid shell 186 between the thermally expandable material 184 and the body 153 of the composite component 150, a more uniform push or force can be applied on the body 153 when the thermally expandable material 184 expands. In this way, the inner surface 157 of the body 153 can be formed to the desired shape with high dimensional accuracy. In addition, as the outer surface 159 of the body 153 is compacted against the second tool portion 142 of the third tool 126, which is fixed, the outer surface 159 of the composite component 150 can be conformed to the desired shape as well.

Figure 6:
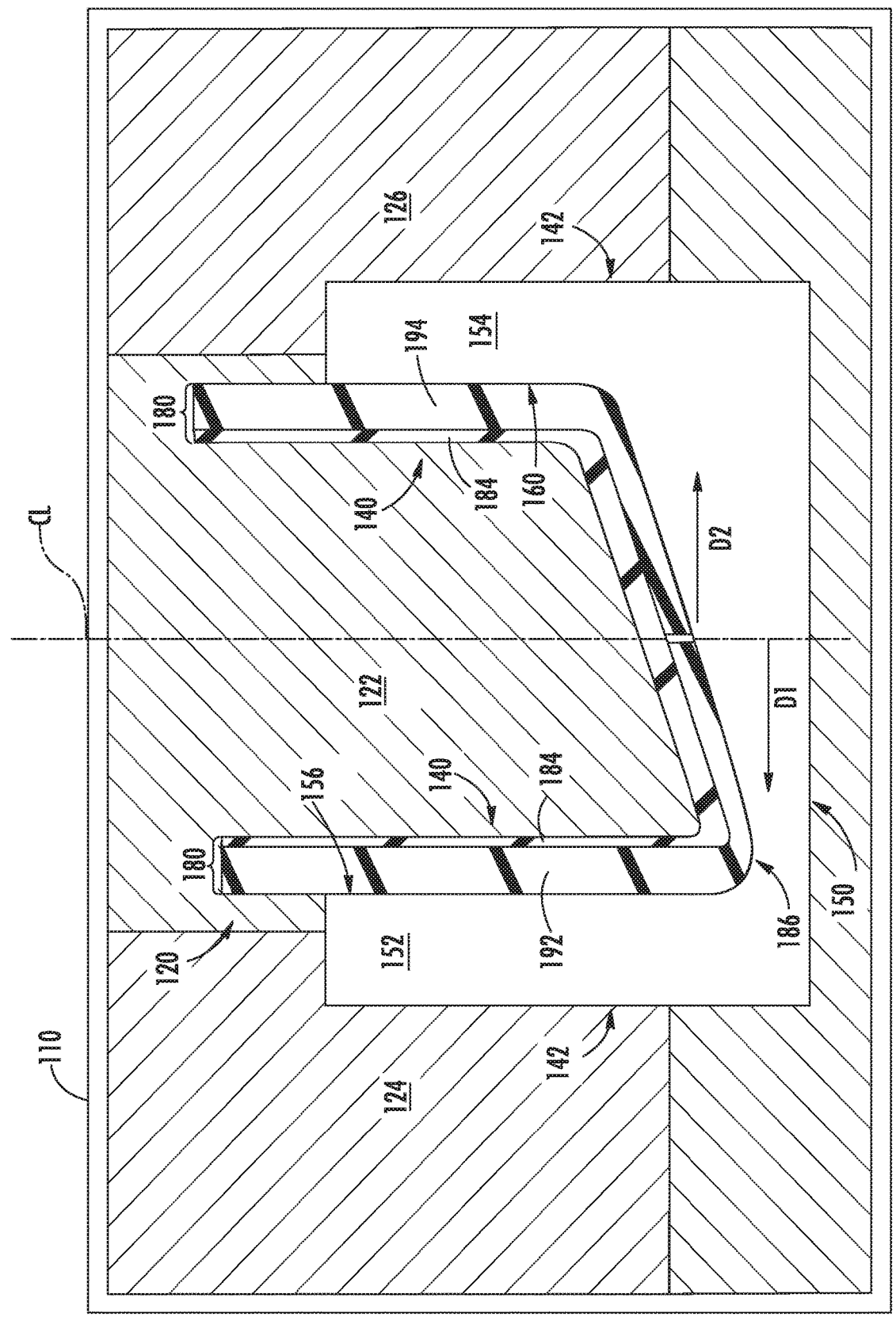
FIG. 6 provides an exemplary rigid shell assembly according to an exemplary embodiment of the present subject matter.

FIG. 6 provides an exemplary embodiment of sandwich structure 180. As shown, for this embodiment, the rigid shell 186 of sandwich structure 180 may be split or include multiple shell members. Stated differently, for this embodiment, rigid shell 186 is not a unitary or single part. As shown in the depicted embodiment of FIG. 6, the rigid shell 186 includes at least two shell members, a first shell member 192 and a second shell member 194. The first shell member 192 and the second shell member 194 are split along a centerline CL. When the thermally expandable material 184 is subjected to elevated temperatures and pressures, e.g., in autoclave 110, the first shell member 192 is pushed or forced in a first direction D1 in a manner as described above and the second shell member 194 is pushed or forced in a second direction D2 in a manner as described above. The second direction D2 is a direction opposite the first direction D1. In this way, advantageously, the inner surface 156 of first flange 152 of the composite component 150 can be compacted with a high degree of dimensional control by the first shell member 192 and the inner surface 160 of a second flange 154 of the composite component 150 can be compacted with a high degree of dimensional control by the second shell member 194. The first flange 152 is positioned between the first tool portion 140 of the first tool 122 and second tool portion 142 of the fixed second tool 124. The second flange 154 is positioned between the first tool portion 140 of the first tool 122 and second tool portion 142 of the fixed third tool 126. If the rigid shell 186 was one integral piece, the dimensional control of one or both of the inner surfaces 156, 160 of the composite component 150 may be compromised as the rigid shell may be forced in one direction (D1 or D2), thereby only compacting one of the inner surfaces 156, 160, or rigid shell 186 may be stalemated without compacting either inner surface 156, 160.

In some embodiments, as noted above, the shell members of the rigid shell 186 can be separate pieces. In alternative exemplary embodiments, the first shell member 192 and the second shell member 194 are retractably coupled by a retraction member. For instance, the retraction member can include tracks disposed on or within one of the shell members and the other shell member can include sliding rails that are slideable along the tracks of the other member. In this way, after the composite component 150 is compacted and removed from the compaction tool 120, the shell members of the rigid shell 186 can more easily be realigned for the next compaction cycle.

Figure 7:
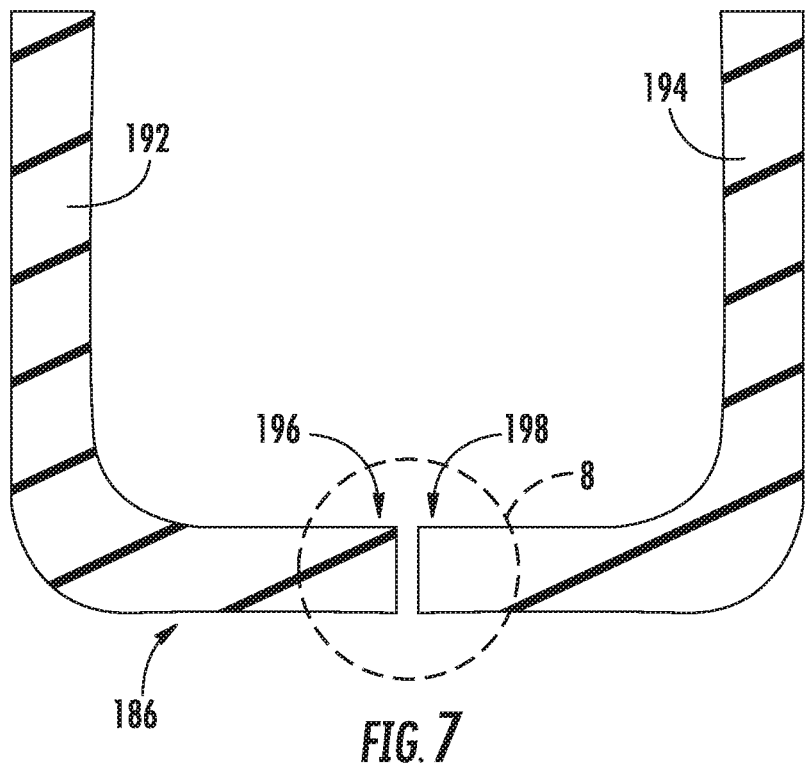
FIG. 7 provides an exemplary rigid shell having separable shell members according to an exemplary embodiment of the present subject matter.
Figure 8:
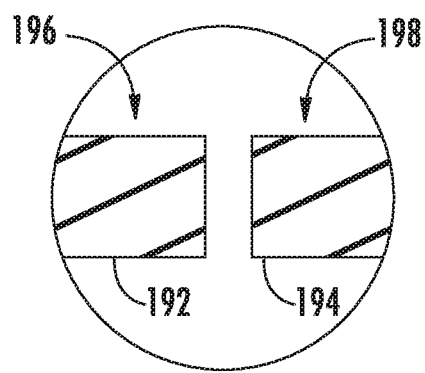
FIG. 8 provides a close up view of Section 8 of FIG. 7 depicting ends of the shell members of the rigid shell.

FIG. 7 provides an exemplary rigid shell 186 having separable shell members 192, 194 according to an exemplary embodiment of the present subject matter. FIG. 8 provides a close up view of Section 8 of FIG. 7 depicting ends of the shell members 192, 194 of the rigid shell 186. For this embodiment, first shell member 192 has a first end 196 and second shell member 194 has a second end 198. As shown particularly in FIG. 8, first end 196 and second end 198 each have complementary flat, butt ends that may come together to form a butt joint. In alternative exemplary embodiments, as provided in FIG. 9, first end 196 and second end 198 may each have complementary scarf ends that may come together to form a scarf joint. Advantageously, where first and second rigid shell members 192, 194 include scarf ends, when the thermally expandable material 184 expands during a compaction cycle, the angled flow path between the first and second rigid shell members 192, 194 makes it more difficult for the thermally expandable material 184 to expand therebetween and cause a non-uniform force on the composite component 150. Additionally, the scarf ends may make it easier to align the first and second rigid shell members 192, 194 when setting up one of the sandwich structures 180 (FIG. 6) for a compaction cycle.

Figure 10:
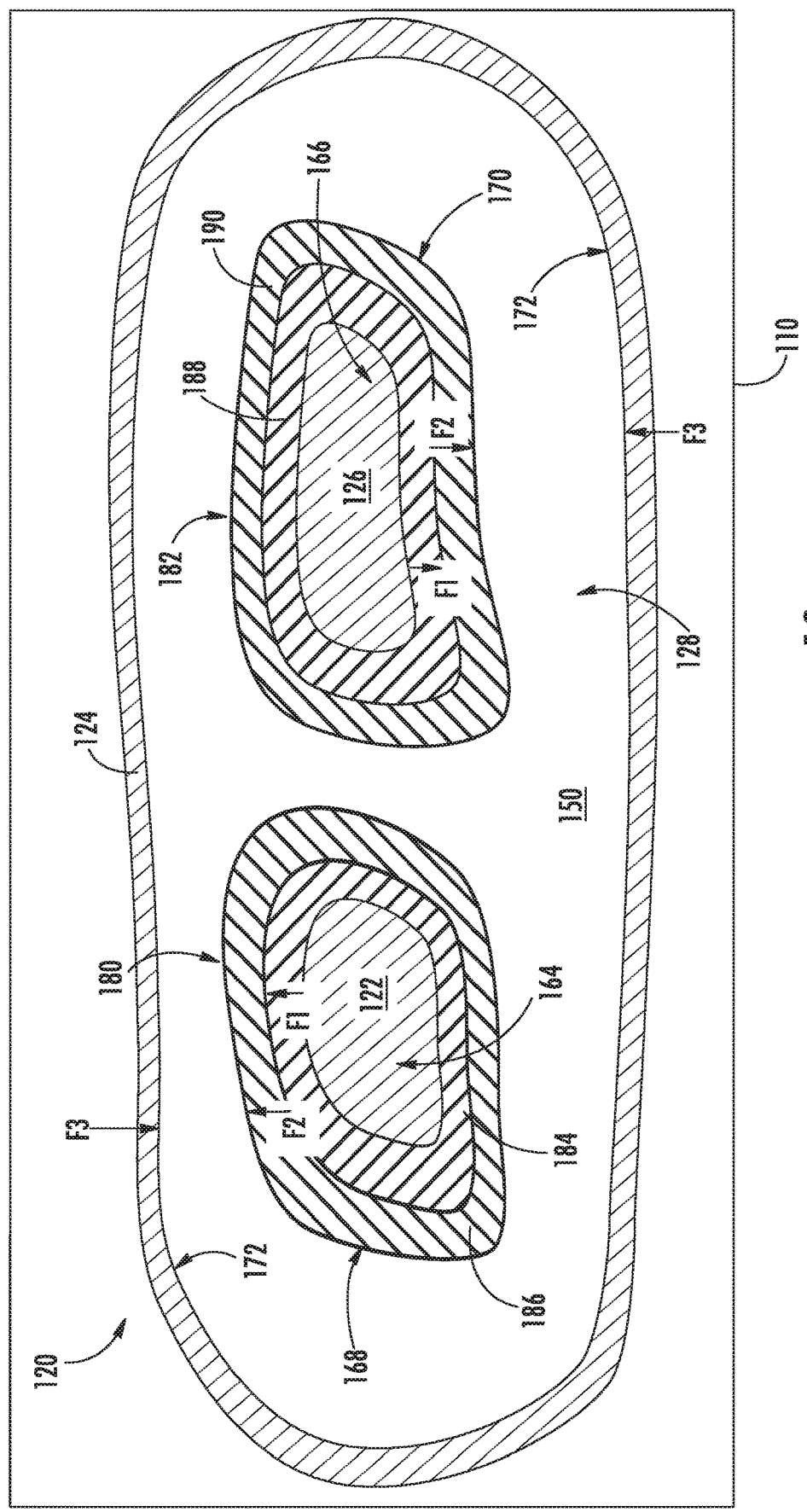
FIG. 10 provides a cross-sectional view of an exemplary hollow structure undergoing a compaction process according to an exemplary embodiment of the present subject matter.

FIG. 10 provides a cross-sectional view of another composite component 150 undergoing a compaction process within autoclave 110 according to an exemplary embodiment of the present subject matter. In the FIG. 10, the composite component 150 is a hollow structure. As shown, the composite component 150 defines at least one internal cavity, and more specifically, the composite component 150 defines a first internal cavity 164 and a second internal cavity 166. As one example, the hollow structure can be an airfoil, such as one of the stator vanes 82 of the turbine nozzle segment 80 of FIG. 2. The first and second internal cavities 164, 166 can be fluidly connected with one or more cooling holes 88 (FIG. 2), for example, so that a cooling airflow can be passed internally through the hollow structure airfoil. Hollow structure is not limited to airfoils; rather, hollow structure can be any composite component having a hollow structure.

As shown in FIG. 10, for this embodiment, the compaction tool 120 includes first tool 122, second tool 124, and a third tool 126. The first tool 122 is positioned within the first internal cavity 164 of the hollow structure composite component 150. The second tool 124 extends along a perimeter of the hollow structure and defines closed volume 128. At least a portion of the composite component 150 is positioned within the volume 128. The third tool 126 is positioned within the second internal cavity 166. The first tool 122, the second tool 124, and the third tool 126 of the compaction tool 120 are all fixed during the compaction cycle.

As further shown in FIG. 10, sandwich structures are shown disposed about the first and third tools 122, 126. More particularly, a first sandwich structure, denoted by 180, is positioned between the first tool 122 and the composite component 150. First sandwich structure 180 includes thermally expandable material 184 and rigid shell 186. The thermally expandable material 184 is shown positioned between the first tool 122 and the rigid shell 186. Likewise, a second sandwich structure 182 is positioned between the third tool 126 and the composite component 150. The second sandwich structure 182 includes thermally expandable material 188 and rigid shell 190. The thermally expandable material 188 is shown positioned between the third tool 126 and the rigid shell 190. Thermally expandable material 188 and rigid shell 190 can be made of the same or similar materials as those described herein for thermally expandable material 184 and rigid shell 186, respectively.

During a compaction cycle or process, the composite component 150 is compacted at elevated temperatures and pressures within the autoclave 110. The first sandwich structure 180, the second sandwich structure 182, and the compaction tool 120 are also subject to the elevated temperatures and pressures within the autoclave 110. In particular, during the compaction cycle, the thermally expandable material 184 of the first sandwich structure 180 and the thermally expandable material 188 of the second sandwich structure 182 both expand outward toward their respective first and second rigid shells 186, 190 as explained more fully below.

The thermally expandable material 184 of the first sandwich structure 180 expands outward from or in a direction opposite the first tool 122 as the first tool 122 is fixed in place during the compaction cycle. As the thermally expandable material 184 expands, it acts as an internal driving force and applies a force F1 on the rigid shell 186 of the first sandwich structure 180. The force F1 applied on the rigid shell 186 causes the rigid shell 186 to move toward the composite component 150. Thus, the rigid shell 186 in turn applies a force F2 on the composite component 150. The second tool 124 applies an opposing force F3 on the composite component 150 to sandwich the composite component 150 therebetween. In this way, the composite component 150 is compacted between the rigid shell 186 and the fixed second tool 124. By positioning the rigid shell 186 between the thermally expandable material 184 and the composite component 150, a more uniform push or force can be applied on the composite component 150 when the thermally expandable material 184 expands. In this way, the inner surface 168 that defines the first internal cavity 164 can be formed to the desired shape with high dimensional accuracy. In addition, as the outer surface 172 of the composite component 150 is compacted against second tool 124, the outer surface 172 of the composite component 150 can be conformed to the desired shape as well.

Likewise, the thermally expandable material 188 of the second sandwich structure 182 expands outward from or in a direction opposite the third tool 126 as the third tool 126 is fixed in place during the compaction cycle. As the thermally expandable material 188 expands, it acts as an internal driving force and applies a force F1 on the rigid shell 190 of the second sandwich structure 182. The force F1 applied on the rigid shell 190 causes the rigid shell 190 to move toward the composite component 150. The rigid shell 190 in turn applies a force F2 on the composite component 150. The second tool 124 applies an opposing force F3 on the composite component 150 to sandwich the composite component 150 therebetween. In this way, the composite component 150 is compacted between the rigid shell 190 and the fixed second tool 124. By positioning the rigid shell 190 of the second sandwich structure 182 between the thermally expandable material 188 of the second sandwich structure 182 and the composite component 150, a more uniform push or force can be applied on the composite component 150 when the thermally expandable material 188 expands. In this way, the inner surface 170 that defines the second internal cavity 166 can be formed to the desired shape with high dimensional accuracy. In addition, as the outer surface 172 of the composite component 150 is compacted against second tool 124, the outer surface 172 of the composite component 150 can be conformed to the desired shape as well.

Figure 11:
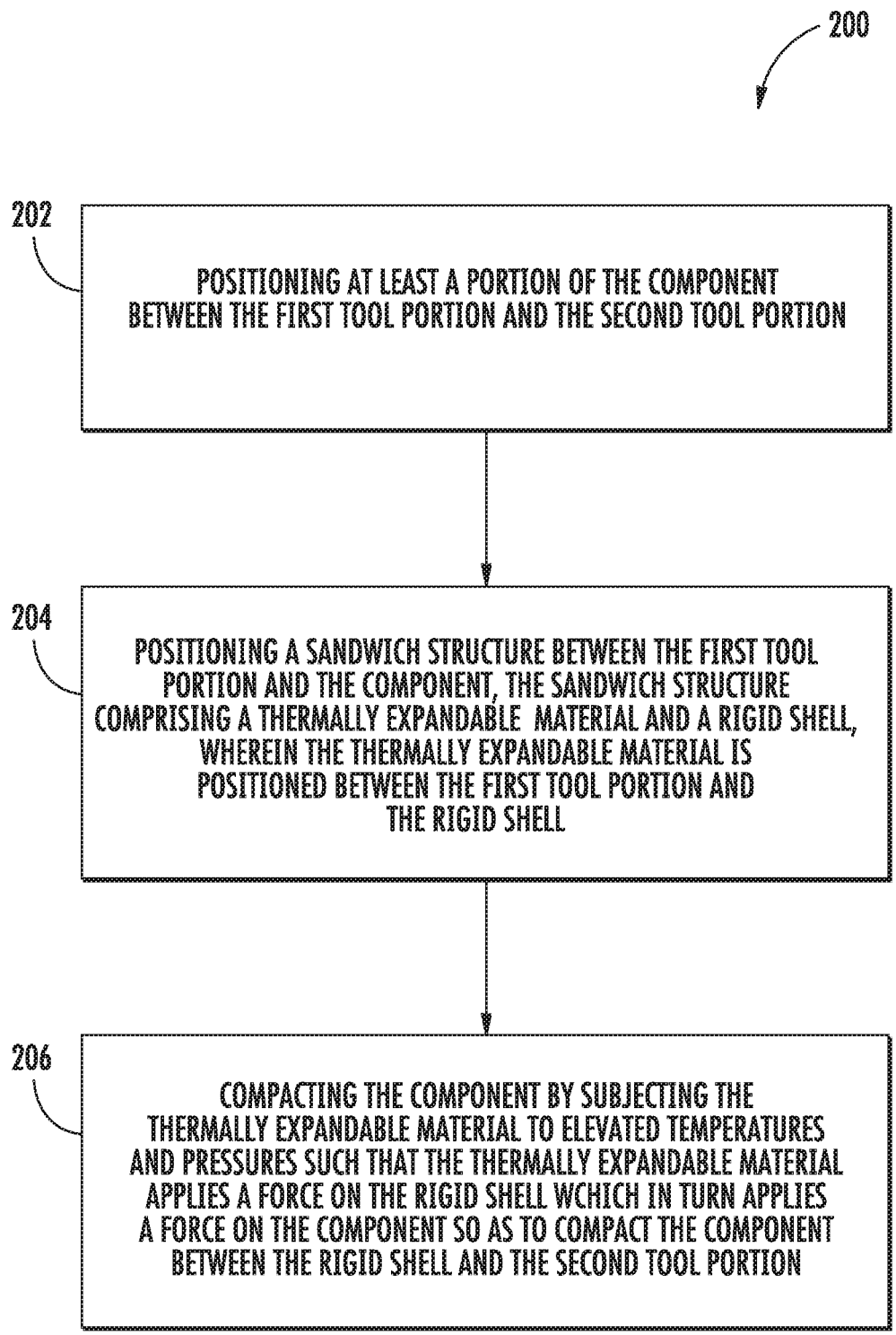
FIG. 11 provides a flow diagram of an exemplary method according to an exemplary embodiment of the present subject matter.

FIG. 11 provides a flow diagram of an exemplary method according to an exemplary embodiment of the present subject matter. In particular, FIG. 11 provides a flow diagram for a method for compacting a component in a compaction tool. In such implementations, the compaction tool includes a first tool portion and a second tool portion. For instance, the compaction tool can be one of the exemplary embodiments of the compaction tool 120 disclosed herein. In some implementations of the method, the component is a solid band structure, such as a band of a turbine nozzle segment. In yet other implementations, the component is a hollow structure, such as an airfoil of a gas turbine engine.

At (202), the method (200) includes positioning at least a portion of the component between the first tool portion and the second tool portion. For instance, the portion of the component positioned between the first tool portion and the second tool portion can be first or second flanges 152, 154 (FIG. 6) of a band of a turbine nozzle segment, such as the turbine nozzle segment 80 of FIG. 2. The component can be formed of a composite material. For instance, in some implementations, the component is formed of a CMC material. In yet other implementations, the component is formed of a PMC material. In some implementations, the first tool portion and the second tool portion of the compaction tool are fixed relative to one another during compaction.

At (204), the method (200) includes positioning a sandwich structure between the first tool portion and the component, the sandwich structure comprising a thermally expandable material and a rigid shell, wherein the thermally expandable material is positioned between the first tool portion and the rigid shell. For instance, in some implementations, the thermally expandable material is an RTV rubber material. In some implementations, the rigid shell has a density greater than a density the component. In yet other implementations, the rigid shell is formed of a metal material. In yet other alternative implementations, the rigid shell is formed of a composite material. For example, the rigid shell formed of a composite material can be formed of a PMC material.

At (206), the method (200) includes compacting the component by subjecting the thermally expandable material to elevated temperatures and pressures such that the thermally expandable material applies a force on the rigid shell which in turn applies a force on the component so as to compact the component between the rigid shell and the second tool portion. In some implementations, the component is compacted in an autoclave.

Figure 9:
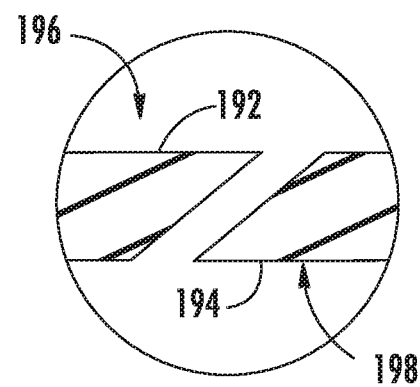
FIG. 9 provides a close up view of ends of shell members of another exemplary rigid shell according to an exemplary embodiment of the present subject matter.

In some implementations, the rigid shell includes at least two shell members. For instance, the rigid shell can include a first shell member and a second shell member. The first shell member and the second shell member can be the first and second shell members disclosed herein and illustrated in FIG. 6, for example. In some implementations, during compacting, the thermally expandable material applies a force on the first shell member of the rigid shell causing the first shell member to move in a first direction and the thermally expandable material applies a force on the second shell member of the rigid shell causing the second shell member to move in a second direction. In some implementations, the first direction is opposite the second direction. By splitting the rigid shell into separate shell members, more surfaces of the component may be compacted with a high degree of dimensional accuracy. In some implementations, the ends of the shell members can be butt ends, e.g., as shown in FIGS. 7 and 9. In yet other implementations, the ends of the shell member can be scarf ends, e.g., as shown in FIG. 9.

Figure 12:
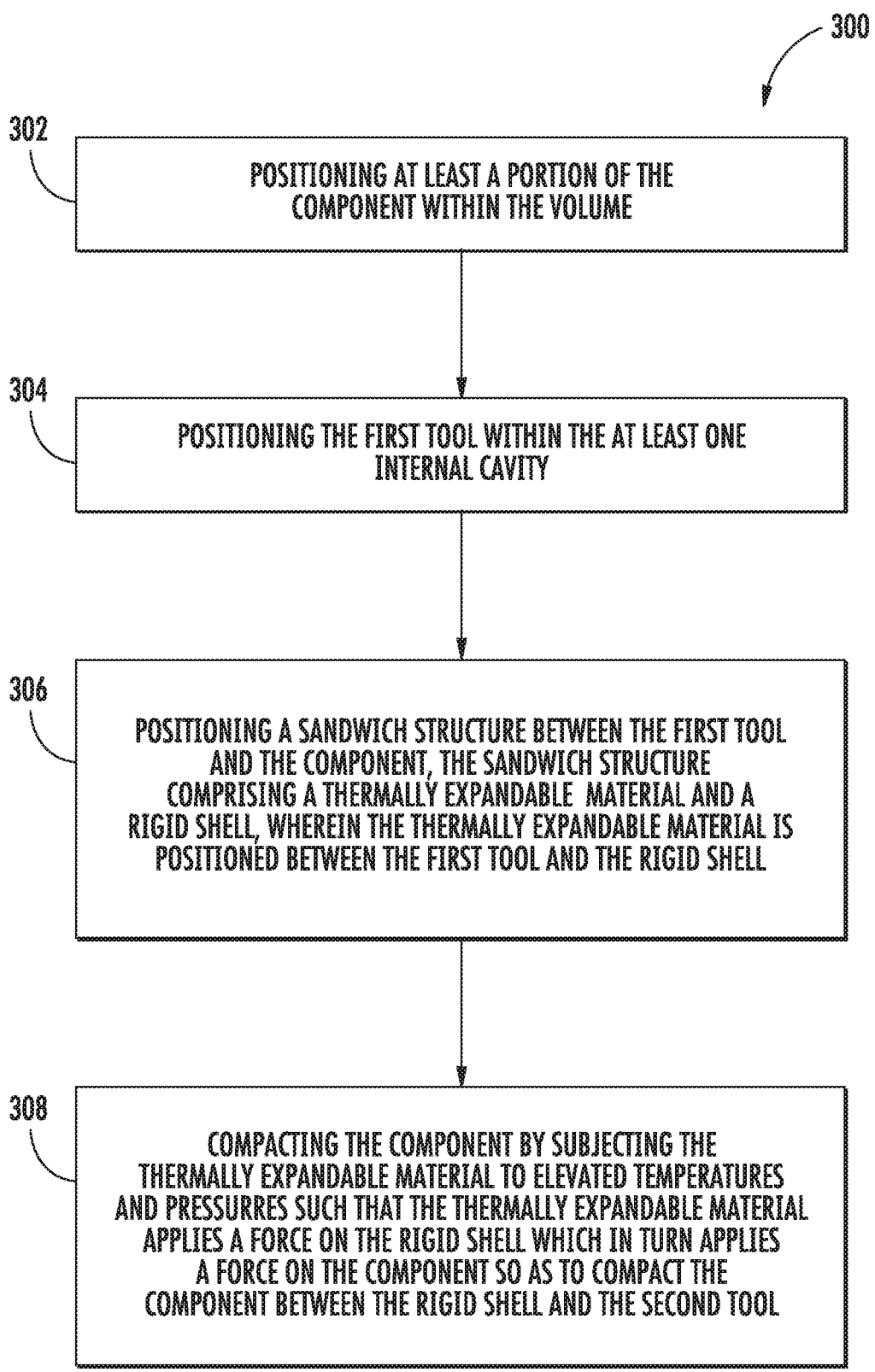
FIG. 12 provides a flow diagram of another exemplary method according to an exemplary embodiment of the present subject matter.

FIG. 12 provides a flow diagram of another exemplary method (300) according to an exemplary embodiment of the present subject matter. In particular, FIG. 12 provides a flow diagram for a method for compacting a component using a compaction tool. In such implementations, the component defines at least one internal cavity. Moreover, the compaction tool includes a first tool and a second tool, the second tool extending along at least a portion of a perimeter of the component and defining a volume. The compaction tool can be one of the exemplary embodiments of the compaction tool 120 disclosed herein. In some implementations of the method, the component is a band of a turbine nozzle segment. In yet other implementations, the component is an airfoil of a gas turbine engine, such as e.g., a fan blade, a turbine rotor blade, a compressor rotor blade, a turbine stator vane, a compressor stator vane, a guide vane, etc. In some implementations, the component is formed of a ceramic matrix composite (CMC) material. In yet other implementations, the component is formed of a polymer matrix composite (PMC) material.

At (302), the method (300) includes positioning at least a portion of the component within the volume. For example, the component can be a hollow structure. The second tool can define a volume that is shaped complementary to the desired geometry of the outer surface of the hollow structure. In such implementations, for example, a portion of the hollow structure can be positioned within the volume defined by the second tool, e.g., as shown in FIG. 10.

At (304), the method (300) includes positioning the first tool within the at least one internal cavity. For example, the internal cavity can be a cooling passage extending internally through a hollow structure, e.g., as shown in FIG. 10. The first tool can be positioned within the internal cavity so as to provide a fixed placeholder for a sandwich structure to leverage during compaction.

At (306), the method (300) includes positioning a sandwich structure between the first tool and the component, the sandwich structure comprising a thermally expandable material and a rigid shell, wherein the thermally expandable material is positioned between the first tool and the rigid shell. In some implementations, the first tool extends along a perimeter, and wherein the sandwich structure is disposed entirely about the perimeter of the first tool between the first tool and the component.

At (308), the method (300) includes compacting the component by subjecting the thermally expandable material to elevated temperatures and pressures such that the thermally expandable material applies a force on the rigid shell which in turn applies a force on the component so as to compact the component between the rigid shell and the second tool. In this way, a high degree of dimensional accuracy can be achieved along the surface or surfaces defining the internal cavity as well as the outer surfaces of the component interfacing with the second tool.

In some implementations, the component further comprises a third tool and defines a second internal cavity. In such implementations, the method (300) further includes positioning the third tool within the second internal cavity. The method also includes positioning a second sandwich structure between the third tool and the component, the second sandwich structure comprising a thermally expandable material and a rigid shell, wherein the thermally expandable material of the second sandwich structure is positioned between the third tool and the rigid shell of the second sandwich structure. In such implementations, during compacting, the thermally expandable material of the second sandwich structure applies a force on the rigid shell of the second sandwich structure which in turn applies a force on the component so as to compact the component between the rigid shell of the second sandwich structure and the second tool.

In some implementations, the rigid shell of the first and/or second sandwich structures include multiple shell members. For instance, the rigid shell of the first and/or second sandwich structures can include a first shell member and a second shell member. In such implementations, during compacting, the thermally expandable material applies a force on the first shell member of the rigid shell causing the first shell member to move in a first direction and the thermally expandable material applies a force on the second shell member of the rigid shell causing the second shell member to move in a second direction. In some implementations, the first direction is opposite the second direction. By splitting the rigid shell into separate shell members, more surfaces of the component may be compacted with a high degree of dimensional accuracy.

Although the figures and the accompanying text disclose exemplary systems and methods for compacting composite components, such as e.g., CMC or PMC components, the systems and methods disclosed herein are applicable to compacting other types of components as well. For example, the systems and methods described and illustrated herein can apply to compaction of metallic components.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A method for compacting a component using a compaction tool, the compaction tool comprising a first tool defining a first tool portion and a second tool defining a second tool portion, the method comprising:

positioning at least a portion of the component between the first tool portion and the second tool portion;

positioning a sandwich structure between the first tool portion and the portion of the component, the sandwich structure comprising a thermally expandable material and a rigid shell, wherein the rigid shell maintains its shape when subjected to elevated temperatures and pressures, wherein the thermally expandable material is positioned between the first tool portion and the rigid shell, the rigid shell is positioned between the thermally expandable material and the component such that the rigid shell is configured to contact the component, and wherein the rigid shell is shaped complimentary to an inner surface of the component; and compacting the component by subjecting the thermally expandable material to elevated temperatures and pressures while the sandwich structure is between the first tool portion and the portion of the component such that the thermally expandable material expands to apply a force on the rigid shell, which causes the rigid shell to be pushed towards the portion of the component and causes the rigid shell to contact and apply a force on the portion of the component so as to compact the portion of the component between the rigid shell and the second tool portion.

2. The method of claim 1, wherein the thermally expandable material is an RTV rubber material.

3. The method of claim 1, wherein the rigid shell has a density greater than a density of the component.

4. The method of claim 1, wherein the compaction tool is a closed tool and the first tool portion and the second tool portion are fixed relative to one another during compacting.

5. The method of claim 1, wherein the component is compacted in an autoclave.

6. The method of claim 1, wherein the rigid shell is formed of a metal material.

7. The method of claim 1, wherein the rigid shell is formed of a composite material.

8. The method of claim 1, wherein the rigid shell comprises at least two shell members.

9. The method of claim 1, wherein the rigid shell comprises a first shell member and a second shell member, and wherein during compacting, the thermally expandable material applies a force on the first shell member of the rigid shell causing the first shell member to move in a first direction and the thermally expandable material applies a force on the second shell member of the rigid shell causing the second shell member to move in a second direction.

10. The method of claim 9, wherein the first direction is opposite the second direction.

11. The method of claim 1, wherein the component is a hollow structure of a gas turbine engine.

12. The method of claim 1, wherein the component is formed of a ceramic matrix composite (CMC) material.

13. The method of claim 1, wherein the component is formed of a polymer matrix composite (PMC) material.

14. The method of claim 1, wherein the rigid shell is in direct contact with both the thermally expandable material and the component.

15. The method of claim 1, wherein the component has an outer surface and an inner surface, the outer surface facing an opposite direction than the inner surface, wherein the outer surface is compacted against the second tool and the inner surface is compacted against the rigid shell.

16. The method of claim 1, wherein the compaction tool further comprises a third tool, wherein the method further comprising positioning a second portion of the component between the first tool and the third tool.

17. The method of claim 1, wherein the portion of the component is a flange of the component.

18. The method of claim 1, wherein the rigid shell includes a plurality of shell members such that the rigid shell is not a unitary part.

* * * * *